United States Patent [19]

Boots

[11] Patent Number: 4,643,478
[45] Date of Patent: Feb. 17, 1987

[54] OPEN ROOF-CONSTRUCTION FOR A VEHICLE

[75] Inventor: Robert T. Boots, Haarlem, Netherlands

[73] Assignee: Vermeulen-Hollandia Octrooien II B.V., Netherlands

[21] Appl. No.: 774,457

[22] Filed: Sep. 10, 1985

[51] Int. Cl.⁴ .......................... B60J 7/05; B60J 7/057; B60J 7/185
[52] U.S. Cl. .................................... 296/221; 296/223; 296/224
[58] Field of Search .............. 296/216, 221, 222, 223, 296/224

[56] References Cited

U.S. PATENT DOCUMENTS

| 4,364,601 | 12/1982 | Katayama et al. | 296/221 |
| 4,420,184 | 12/1983 | Kaltz | 296/221 |

FOREIGN PATENT DOCUMENTS

| 30568 | 7/1984 | Japan | 296/222 |
| 128011 | 7/1984 | Japan | 296/222 |
| 2128249 | 4/1984 | United Kingdom . | |

Primary Examiner—Robert B. Reeves
Assistant Examiner—Dennis H. Pedder
Attorney, Agent, or Firm—Kinney & Lange, P.A.

[57] ABSTRACT

An open roof construction for a vehicle which has a roof opening comprises a panel that is movable downwardly from a closed position in the roof opening to an open position at least partially under the fixed roof and which panel also can be tilted from its closed position so that it inclines upwardly and rearwardly for ventilation. The panel is moved by moving a slide plate that is guided in a stationary, substantially horizontal guide. The slide plate and panel are connected by a link that has three legs, with a first leg being pivotally connected to the panel and to a further slide piece also guided in the stationary guide and with the second leg being connected to the first leg intermediate the ends of the first leg. The third leg is an auxiliary leg that is pivotally mounted to the first leg along the first leg/slide piece pivot axis, and has a guide pin that engages a guide slot in the slide plate forwardly of the pivotal connection between the auxiliary leg and the first leg so that the movement of the auxiliary leg is controlled by the guide pin engaging the guide slot. The legs cooperate to provide the necessary movements for insuring that the panel will be held in its closed position securely, and yet can be moved to ventilation and full open positions.

18 Claims, 5 Drawing Figures

OPEN ROOF-CONSTRUCTION FOR A VEHICLE

The invention relates to an open roof-construction for a vehicle having a roof opening, comprising a panel, which is movable downwardly from the closed position in the roof opening to a position, from which the panel is displaceable to a completely or partially opened position under the fixed roof, whereafter the panel may be returned to the closed position, whilst furthermore the panel can be moved from the closed position to a rearwardly and upwardly inclined ventilation position and from this ventilation position can be moved back again to the closed position, whilst for displacing the panel a push-pull means on at least one side engages a slide plate which is guided in a stationary, substantially horizontal guide, the panel being displaceably supported near its front side, whilst the panel and the slide plate are connected with each other at a distance behind the front side of the panel by a connection means having a guide pin engaging a guide slot in the slide plate and said connection means being guided in the stationary guide, and said connection means comprises a link means having two legs, the upper portion of the first leg thereof pivotably engaging the panel by means of a transverse pivot shaft and the second leg thereof being pivotably connected to the first leg intermediate the ends of the first leg by means of a second transverse pivot shaft.

In an known embodiment of such an open roof-construction the disadvantage arises, that during the pivoting movement of the panel a small displacement of the push and pull means causes a relatively large angular rotation of the panel whereby the operation requires comparatively much force.

It is an object of the present invention to provide an open roof-construction for a vehicle of the type mentioned above, with which the afore mentioned disadvantage is removed in an efficient way.

For this purpose the open roof-construction according to the invention is characterized in that the connection means further comprises an auxiliary leg which is connected to one of the legs of the link means and which carries the guide pin engaging the guide slot in the slide plate forwardly of the connecting point between the auxiliary leg and the link means.

Because the guide pin is provided on the auxiliary leg in such manner that the connecting point between the guide pin and the slide plate is displaced forwardly a longer guide slot in the slide plate may be used, whereby a relatively large displacement of the push and pull means causes a relatively small angular rotation of the panel.

In this way the swiveling of the panel requires little force, and a fine and precise adjustment thereof has been obtained without an adverse effect on driving the slide plate during the sliding movement of the panel.

The invention will hereafter be elucidated with reference to the drawings, which show an embodiment of the open roof-construction according to the invention by way of example.

Figure 1:
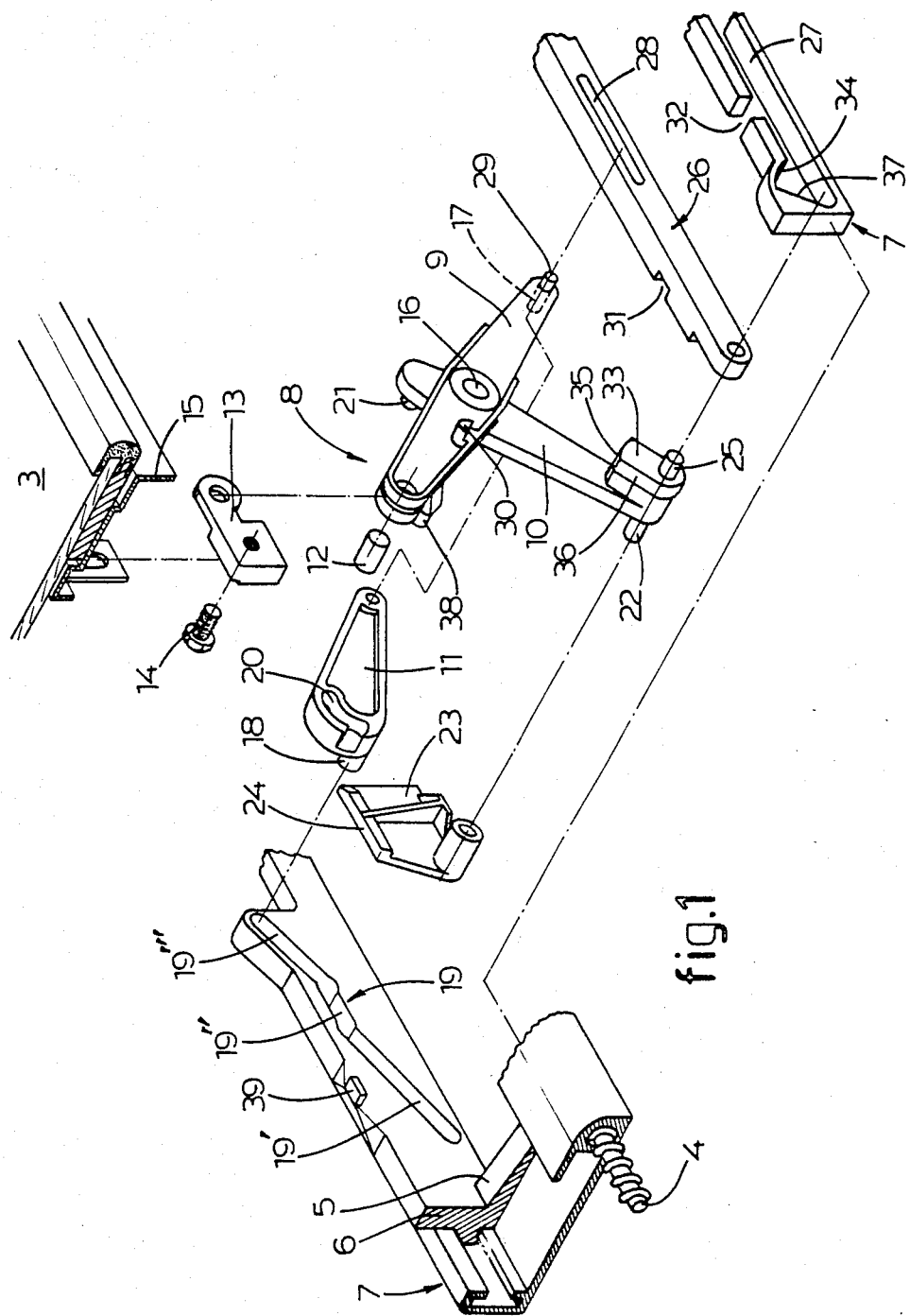
FIG. 1 is a schematic perspective view of a portion of an embodiment of the open roof-construction according to the invention, wherein various parts have been illustrated separated from each other.

The drawings represent by way of example an embodiment of an open roof-construction for a vehicle, which has been provided with an opening 1 in the fixed roof 2.

This open roof-construction comprises a panel 3 that can be moved from the closed position in the roof opening 1 (FIG. 3) to a rearwardly and downwardly inclined position (FIG. 2), from which the panel 3 can be displaced rearwardly underneath the fixed roof 2 to a completely or partially opened position and thereupon can be moved back from this position to the closed position.

Furthermore, the panel 3 can be moved from the closed position to a rearwardly and upwardly inclined ventilation position (FIG. 5) and thereupon can be moved back from this ventilation position to the closed position.

For displacing the panel 3 a cable-like push-pull means has been provided at least at one side, but in general at each side of the open roof-construction, which push-pull means can be displaced by an actuating member (not illustrated) in the longitudinal direction of the vehicle and engages a bracket 5 on a slide plate 6 that is guided in a substantially horizontal guide 7 mounted in the vehicle.

Generally, at either side of the vehicle such a stationary substantially horizontal guide 7 has been arranged, each guide guiding a slide plate 6 disposed at the respective side of the vehicle, while each slide plate 6 can be moved by its own cable-like push-pull means 4 in its stationary guide 7 and both push-pull means 4 can be commonly displaced.

In the embodiment represented in the drawings always only the slide plate 6 and the stationary guide 7 disposed at one side of the vehicle as well as the connection means 8 co-operating therewith and hereinafter further described have been shown, it being understood that in general at the other side of the vehicle similar members have been used, which constitute the mirror image of the elements represented in the drawings.

The panel 3 is displaceably supported near the front side (not shown).

At a distance behind the front side of the panel 3 the panel 3 and the slide plate 6 are connected with each other by the connection means 8, which comprises a link means with two legs 9 and 10, as well as an auxiliary leg 11.

The upper portion of the first leg 9 of this link means is pivotably connected by a transverse pivot shaft 12 to a bracket 13, which is secured by means of a bolt 14 to an angle section 15 mounted underneath the panel 3.

The second leg 10 is pivotably connected with the leg 9 between the ends of the leg 9, by means of a second transverse pivot shaft 16.

A third pivot shaft 17 is fixed at the lower portion of the leg 9 of the link means, which pivot shaft 17 is pivotably connected to the lower portion of the auxiliary leg 11.

The auxiliary leg 11 carries a horizontal guide pin 18 near its upper end, the guide pin 18 engaging a guide slot 19 which has two closed ends and which is formed in the slide plate 6. The guide slot 19 in the slide plate 6 has a stepped configuration and includes a rearwardly and upwardly inclined front portion 19', a substantially horizontal portion 19" joining the rear side thereof, and a rearwardly and upwardly inclined rear portion 19''' joining the rear side of the substantially horizontal portion.

A guide slot 20, which is open on one end and which has a curved configuration is formed in the auxiliary leg 11 on the side facing away from the guide pin 18. During a part of the linking movement of the legs 9, 10 a guide peg 21 near the upper end of the second leg 10 engages the guide slot 20 in the auxiliary leg 11, so that in this case the auxiliary leg 11 is connected to the leg 9, as well as to the leg 10 and the relative movements of both legs 9 and 10 are completely determined by the auxiliary leg 11.

At the lower portion of the leg 10 a transverse pivot shaft 22 is formed, which is rotatably connected to a support plate 23. This support plate 23 is provided with a support surface 24, which supports the guide pin 18 on the auxiliary leg 11, when this guide pin 18 is in the upper position in the guide slot 19 of the slide plate 6. In this way the auxiliary leg 11 is supported and locked in its maximum upwardly pivoted position.

A further transverse pivot shaft 25 is formed on the leg 10 in the extension of the pivot shaft 22 at the other side of the leg 10, which pivot shaft 25 is pivotably connected to the front portion of the slide piece 26. This slide piece 26 is slidably guided in a slot 27 in the stationary guide 7. In the foremost position of the panel 3 the slide piece 26 engages the front side of the slot 27.

The slide piece 26 itself is provided with a horizontal slot 28, in which a transverse pin 29 engages, the transverse pin 29 being fastened near the lower end of the leg 9 and being aligned with the pivot shaft 17. The pin 29 extends in opposite direction from pin 17, with respect to the plane of the first leg. During the linking movement of the connection means 8 the transverse pin 29 passes through the slot 28 in the then stationary slide piece 26.

In the maximum downwardly swivelled position of the leg 9 and therefore in the rearwardly and downwardly inclined position of the panel 3 a cam 30 on the leg 9 between the pivot shafts 12 and 16 is received in a recess 31 in the slide piece 26. When the panel 3 and therefore the slide piece 26 are in a position moved rearwardly from the foremost position the cam 30 is also in engagement with the upper side of the slot 27 of the stationary guide 7, whereby it is prevented that the leg 9 of the connection means 8 swivels upwardly in these positions.

In the foremost position of the slide piece 26 the recess 31 thereof is in line with a passage 32 in the stationary guide 7 above the slot 27, so that the cam 30 on the leg 9 can enter or leave the recess 31.

At the lower portion of the leg 10 at the side facing away from the slide plate 6 a protrusion 33 is formed, which is rotatable in a recessed portion of the slide piece 26 and which is also partly received in the slot 27 of the stationary guide 7. In the maximum downwardly swivelled position of the leg 10 the protrusion 33 is fittingly slidable in the slot 27.

At the front side of the slot 27 a curved surface 34 is formed in the stationary guide 7, which curved surface 34 co-operates with a curved surface 35 on the protrusion 33 in the upwardly swivelled positions of the leg 10. The centre of curvature of the curved surface 35 coincides with the centre line of the pivot shaft 25. The surfaces 34, 35 thereby form a lock against a backward displacement of the leg 10 in the slot 27 in the upwardly swivelled positions of the leg 10.

In the upper position of the leg 10 and thereby of the connection means 8 the flat surface 36 of the protrusion 33 lies against the inclined surface 37 at the front side of the slot 27. In this way the surfaces 36 and 37 also determine the upper position of the connection means 8.

Near the upper end of the leg 9 at the side facing the slide plate 6 a cam 38 is provided, which lies under a shoulder 39 formed on the slide plate 6 in the closed position of the panel 3. In this way the panel 3 cannot be swivelled upwardly from the closed position in an undesired manner, because the leg 9 is locked against an upward swivelling movement.

Figure 2:
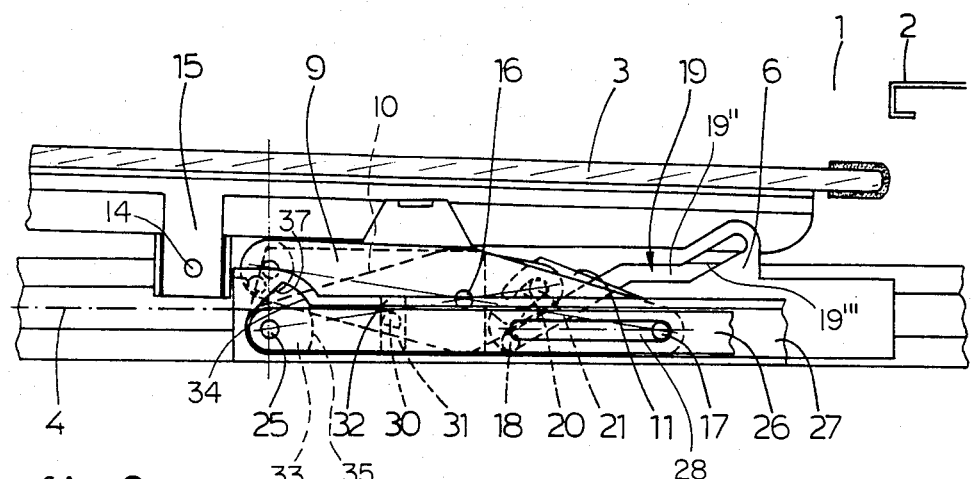
FIGS. 2, 3, 4 and 5 are longitudinal sectional views of the portion of the open roof-construction of FIG. 1 in different positions.

FIG. 2 shows the panel 3 in its rearwardly and downwardly inclined position, in which the panel 3 is movable under the fixed roof 2 to a wholly or partly opened position, and back. In this position, the angle between the lower portion of the leg 9 and the lower portion of the leg 10 is maximum, while the auxiliary leg rests with its lower face on the guide and extends substantially horizontally in the foreward direction from the pivot shaft 17. The foremost position of the panel 3 is reached when the front side of the slide means 26 comes into engagement with the front side of the slot 27 in the stationary guide 7.

In case the slide plate 6 is slid further forwardly by means of the push-pull means 4 from the position of FIG. 2, the guide pin 18 on the auxiliary leg 11 will pass through the portion 19' of the guide slot 19. Because the slot portion 19' is inclined rearwardly and upwardly the auxiliary leg 11 will swivel about the pivot shaft 17. The engagement of the guide peg 21 on the leg 10 and the guide slot 20 in the auxiliary leg 11 will cause the leg 10 to swivel about the pivot shafts 22, 25, while the leg 9 swivels about the pivot shaft 17 through the connection between the legs 9 and 10 at the pivot shaft 16, whereby the panel 3 moves upwardly at the rear side. The protrusion 30 on the leg 9 leaves the recess 31 in the slide piece 26 through the passage 32, while the transverse pin 29 on the leg 9 moves somewhat forwardly in the slot 28 in the slide piece 26. The guide pin 21 on the leg 10 starts to pass through the guide slot 20 in the auxiliary leg 11.

Figure 3:
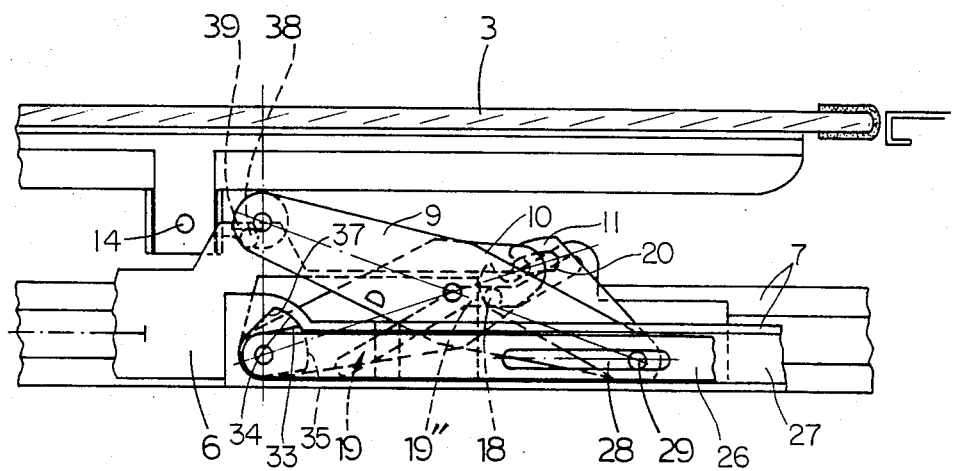

In FIG. 3 the panel 3 has reached its closed position. The guide pin 18 on the auxiliary leg 11 is then in the horizontal portion 19" of the guide slot 19 in the slide plate 6. This horizontal portion 19" allows a certain free movement of the slide plate 6, while the panel 3 remains in the closed position. The cam 38 near the upper end of the leg 9 lies under the shoulder 39 on the slide plate 6 in the closed position of the panel 3. It can be seen that the guide pin 21 engages slot 20 as the panel moves between the positions of FIG. 2 and FIG. 3.

Figure 4:
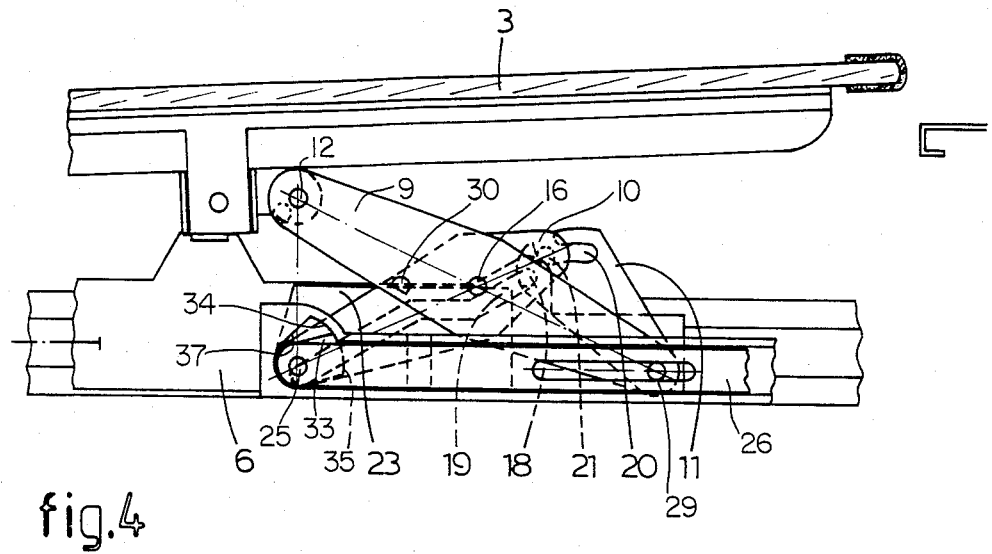

In the position of FIG. 4 the guide pin 18 on the auxiliary leg 11 has reached the upper end of the portion 19''' of the guide slot 19, while in this position the guide peg 21 on the leg 10 is lying underneath the inlet or outlet of the open guide slot 20.

when the guide pin 18 passes through the guide slot 19 in the slide plate 6 it moves upwardly along the rear side of the support plate 23. In the position of FIG. 4 the guide pin 18 just projects over the upper side of the support plate 23. The auxiliary leg 11 is upwardly and forwardly inclined in the positions of FIG. 3 and FIG. 4.

Figure 5:
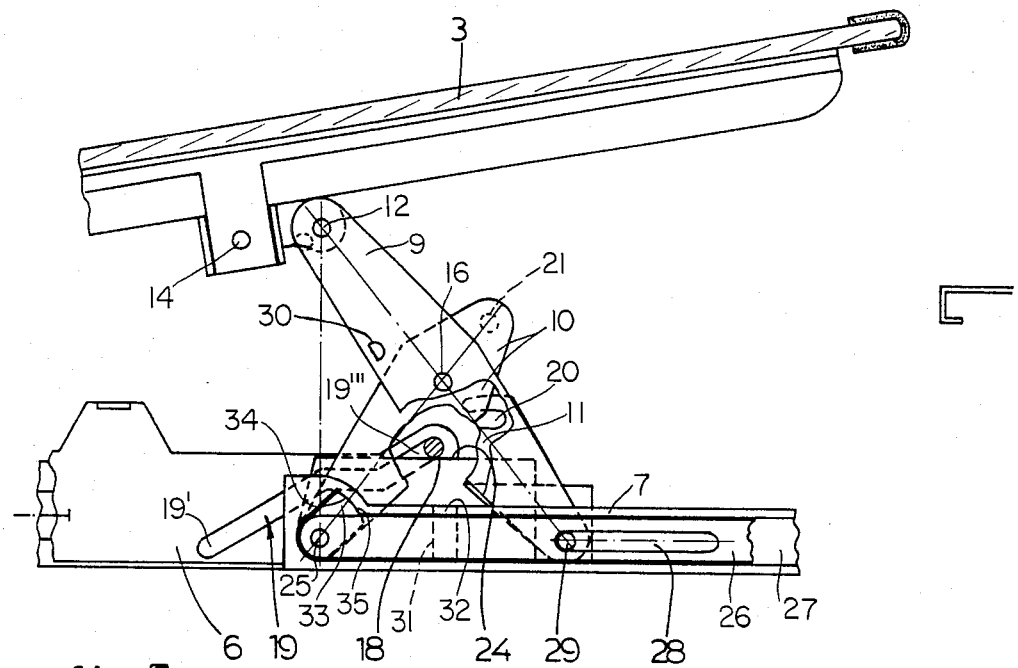

When the slide plate 6 is moved further forwardly to the position of FIG. 5, the rear end of the guide slot 19 in the slide plate 6 will carry the guide pin 18 forwardly. Then the pivot shaft 17 at the lower end of the auxiliary leg 11 will also slide forwardly, so that the lower end of the leg 9 is carried along and the transverse pin 29 will further pass through the slot 28 in the slide piece 26.

The guide peg 21 on the leg 10 can leave the guide slot 20 in the auxiliary leg 11 through the outlet or inlet, whereafter the legs 9, 10 can carry out a free linking movement about the pivot shaft 16, whereby the panel 3 can be brought to its utmost ventilation position (FIG. 5).

During the displacement of the panel 3 from the position of FIG. 4 the guide pin 18 slides over the support surface 24 of the stationary support plate 23, while the guide pin 18 is in engagement with the rear and upper end of the guide slot 19 in the slide plate 6. In consequence thereof the guide pin 18 is completely retained, so that the auxiliary leg 11 is fixed in its inclined position and is locked against a movement relative to the slide plate 6.

When the panel 3 is moved from its ventilation position of FIG. 5 to the closed position of FIG. 3 or to the rearwardly and downwardly inclined position of FIG. 2, respectively the displacements of the connection means 8 are carried out in the reverse direction.

The invention is not restricted to the embodiment shown in the drawing by way of example, which may be varied within the scope of the invention in various ways.

What is claimed is:

1. An open roof construction for a vehicle having a roof with an opening, comprising a panel movable downwardly from a first closed position in the roof opening to a second position, from which the panel is displaceable to a third completely or partially opened position under the fixed roof, the panel being returnable to the closed position, the panel being movable from the closed position to a fourth rearwardly and upwardly inclined ventilation position and from this ventilation position being movable back again to the closed position, a slide plate which is guided in a stationary, substantially horizontal guide on at least one side of the opening, said slide plate having a guide slot, push pull means engaging the slide plate, the panel and the slide plate being connected with each other at a distance behind the front side of the panel by connection means having a guide pin engaging the guide slot in the slide plate, means for guiding said connection means in the stationary guide and said connection means comprising link means having first and second legs, a first pivot shaft pivotably connecting the upper portion of the first leg to the panel, a second transverse pivot shaft pivotably connecting the second leg to the first leg intermediate the ends of the first leg, the connection means further comprising an auxiliary leg, which is connected to one of the first and second legs of the link means and which carries the guide pin engaging the guide slot in the slide plate forwardly of the connection between the auxiliary leg and the one leg of the link means.

2. An open roof construction as claimed in claim 1, wherein the auxiliary leg is pivotably connected to the one leg of the link means by a third transverse pivot shaft forming a pivotable connection.

3. An open roof construction as claimed in claim 2, wherein the auxiliary leg is connected to the first leg of the link means.

4. An open roof construction as claimed in claim 3, wherein the third pivot shaft extends between the lower portion of the auxiliary leg and the lower portion of the first leg of the link means.

5. An open roof construction as claimed in claim 1, wherein at least in the positions of the panel between the second position and the first closed position the auxiliary leg engages the link means at a further point.

6. An open roof construction as claimed in claim 5, wherein the further engagement point of the auxiliary leg and the link means comprises an engagement between the auxiliary leg and the second leg of the link means.

7. An open roof construction as claimed in claim 6, wherein the engagement of the auxiliary leg and the link means comprises a guide peg which engages a second guide slot.

8. An open roof construction as claimed in claim 7, wherein the second guide slot is provided in the upper portion of the auxiliary leg, and the guide peg is formed at the upper portion of the second leg of the link means.

9. An open roof construction as claimed in claim 1, wherein the guide slot in the slide plate has a stepped configuration including a rearwardly and upwardly inclined front portion, a substantially horizontal portion joining and extending rearwardly of the front portion and a rearwardly and upwardly inclined rear portion joining and extending rearwardly of the substantially horizontal portion.

10. An open roof construction as claimed in claim 9, wherein in the second position of the panel the auxiliary leg extends substantially horizontally in a forward direction from the connection of the auxiliary leg with the link means, and in the positions of the panel between the second position and the fourth upwardly inclined ventilation position the auxiliary leg is forwardly and upwardly inclined from its connection with the link means.

11. An open roof construction as claimed in claim 2 wherein the second leg of the link means at its lower end on the side facing away from the slide plate is pivotably connected to a slide piece by means of a fourth transverse pivot shaft, which slide piece is slidably guided in the stationary guide, whilst the first leg of the link means carries a transverse pin aligned and opposed to the third pivot shaft, which transverse pin is guided in a longitudinal substantially horizontal slot in the slide piece, the transverse pin traversing the slot in the slide piece, and locking means to lock the slide piece in its foremost position during the pivoting movement of the panel.

12. An open roof construction as claimed in claim 11, wherein the first leg carries a locking cam between the first and the second pivot shafts, which locking cam extends outwardly from the first leg in a direction to be slidably retained under an edge of the stationary guide in the downwardly moved position of the panel, the locking cam being releasable from the stationary guide in a foremost position of the panel.

13. An open roof construction as claimed in claim 1, wherein the guide pin moves rearwardly and upwardly in the guide slot, and support means underlying the guide pin on the auxiliary leg when the guide pin is in a rearmost, upper position in the guide slot in the slide plate, said support means locking the guide pin in the guide slot.

14. An open roof construction as claimed in claim 13, wherein the support means is formed by a support plate, said support plate being provided with a support surface on its upper side, the support plate being pivotably connected to a lower end of the second leg of the link means by a fifth transverse pivot shaft.

15. An open roof construction as claimed in claim 1, wherein the slide plate is provided with a transverse shoulder on a side facing the connection means, wherein in the closed position of the panel a lower side of the transverse shoulder is in engagement with a cam near an upper free end of the first leg.

16. An open roof construction as claimed in claim 1, wherein the stationary guide has a slot therein, said second leg being provided with a protrusion formed at a lower portion thereof on the side facing away from the slide plate, said protrusion having a curved edge surface, said protrusion being partly received in said slot of the stationary guide in a maximum downwardly swivelled position of the second leg, and in an upwardly swivelled position of the second leg the curved edge surface of the protrusion co-operates with a similarly curved surface in the stationary guide so as to lock the second leg against rearward movement.

17. A roof construction for a vehicle having a roof opening, comprising a panel of size to fit in the roof opening, and being movable from a first closed position in the roof opening downwardly to permit sliding the panel rearwardly at least partially under the fixed roof to an open position the panel also being movable between the closed position and a rearwardly and upwardly inclined ventilation position, a stationary, substantially horizontal guide on at least one side of the roof opening, a slide plate guided in said stationary, substantially horizontal guide and movable between a forward position and a rearward position along the horizontal guide, means for actuating said slide plate along said horizontal guide, said slide plate having a slot therein extending in a direction along said horizontal guide, means for connecting the panel and the slide plate with each other comprising link means having first, second and third legs, each leg having first and second end portions, means for pivotably connecting the first end portion of the first leg to the panel and the second end portion of the first leg to a slide piece, means for pivotably connecting one end portion of the second leg to the slide piece, means for connecting the second leg to the first leg intermediate the end portions of the first leg, means for connecting a first end portion of the third leg to one of the first and second legs, and a guide pin connected to the second end portion of the third leg, said guide pin engaging the guide slot in the slide plate forwardly of the connection between the third leg and said one leg.

18. A roof construction as claimed in claim 17 wherein the first leg is connected relative to the slide piece for pivotable movement about a pivot axis, and said third leg is connected to the first leg for pivotable movement substantially about said pivot axis.

* * * * *